United States Patent
Hahn et al.

(10) Patent No.: US 11,018,963 B1
(45) Date of Patent: May 25, 2021

(54) DYNAMIC GRANULARITY OF TIME SERIES DATA BASED ON NETWORK CONDITIONS

(71) Applicant: Amazon Technologies, Inc., Seattle, WA (US)

(72) Inventors: Pascal Hahn, Seattle, WA (US); Sergejus Barinovas, Mercer island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/835,281

(22) Filed: Mar. 30, 2020

(51) Int. Cl.
*H04L 12/00* (2006.01)
*H04L 12/26* (2006.01)
*H04L 12/24* (2006.01)

(52) U.S. Cl.
CPC ........ *H04L 43/067* (2013.01); *H04L 41/0622* (2013.01); *H04L 41/22* (2013.01); *H04L 43/0817* (2013.01); *H04L 43/0823* (2013.01); *H04L 43/0888* (2013.01)

(58) Field of Classification Search
CPC ............... H04L 43/067; H04L 43/0817; H04L 41/6622; H04L 43/0888; H04L 41/22; H04L 43/0823
USPC ................................ 709/223, 224, 225, 226
See application file for complete search history.

(56) References Cited

U.S. PATENT DOCUMENTS

| | | | | |
|---|---|---|---|---|
| 2003/0172368 A1* | 9/2003 | Alumbaugh | .............. | G06F 8/71 717/106 |
| 2004/0017800 A1* | 1/2004 | Lupper | ............... | H04L 61/2084 370/352 |
| 2005/0074239 A1* | 4/2005 | Pohjola | .................... | H04K 1/00 398/70 |

* cited by examiner

*Primary Examiner* — Frantz Coby
(74) *Attorney, Agent, or Firm* — Davis Wright Tremaine LLP

(57) ABSTRACT

Technology is described for receiving time series data to be transmitted to a server. A network connectivity problem may be determined to exist for a computer network with the server which prevents the time series data from being transmitted to the server. A downsampling function may be applied to the time series data to produce reduced granularity data points that represent an approximation of the time series data to be transmitted to the server after the network connectivity problem has occurred with the server. The reduced granularity data points may be transmitted to the server.

20 Claims, 11 Drawing Sheets

DYNAMIC GRANULARITY OF TIME SERIES DATA BASED ON NETWORK CONDITIONS

BACKGROUND

Electronic devices and computing systems have become ever-present in many aspects of society. Devices may be found in the workplace, at home, or at school. Computing systems may include computing and data storage systems to process and store data. Some computing systems have begun offering centralized, virtual computing options known as service provider environments that may reduce overall costs, improve availability, improve scalability, and reduce time to deploy new applications.

Advancements in communication technologies have allowed even relatively simple electronic devices to communicate with other devices and computing systems over a computer network. For example, the Internet of Things (IoT) is the interconnection of computing devices scattered across the globe using the existing Internet infrastructure. Such devices may be able to capture data, and then the devices may securely communicate the data over a network to a centralized computing service in a service provider environment. In one example, the devices may send the data to a computing hub or computing node in a local wireless network, and the computing hub may forward the data received from the devices to the centralized service in the service provider environment.

Electronic devices (e.g., IoT devices or embedded devices) may be included in a variety of physical devices or products, such as industrial equipment, farm machinery, home appliances, manufacturing devices, industrial printers, automobiles, thermostats, smart traffic lights, vehicles, buildings, etc. These physical devices may have embedded electronics, software, sensors, and network connectivity that enables these physical devices to collect and send data. Electronic devices (e.g., IoT devices, etc.) may be useful for a number of applications, such as environmental monitoring, farming, infrastructure management, industrial applications, building and home automation, energy management, medical and healthcare systems, transport systems, etc.

DETAILED DESCRIPTION

Figure 1A:
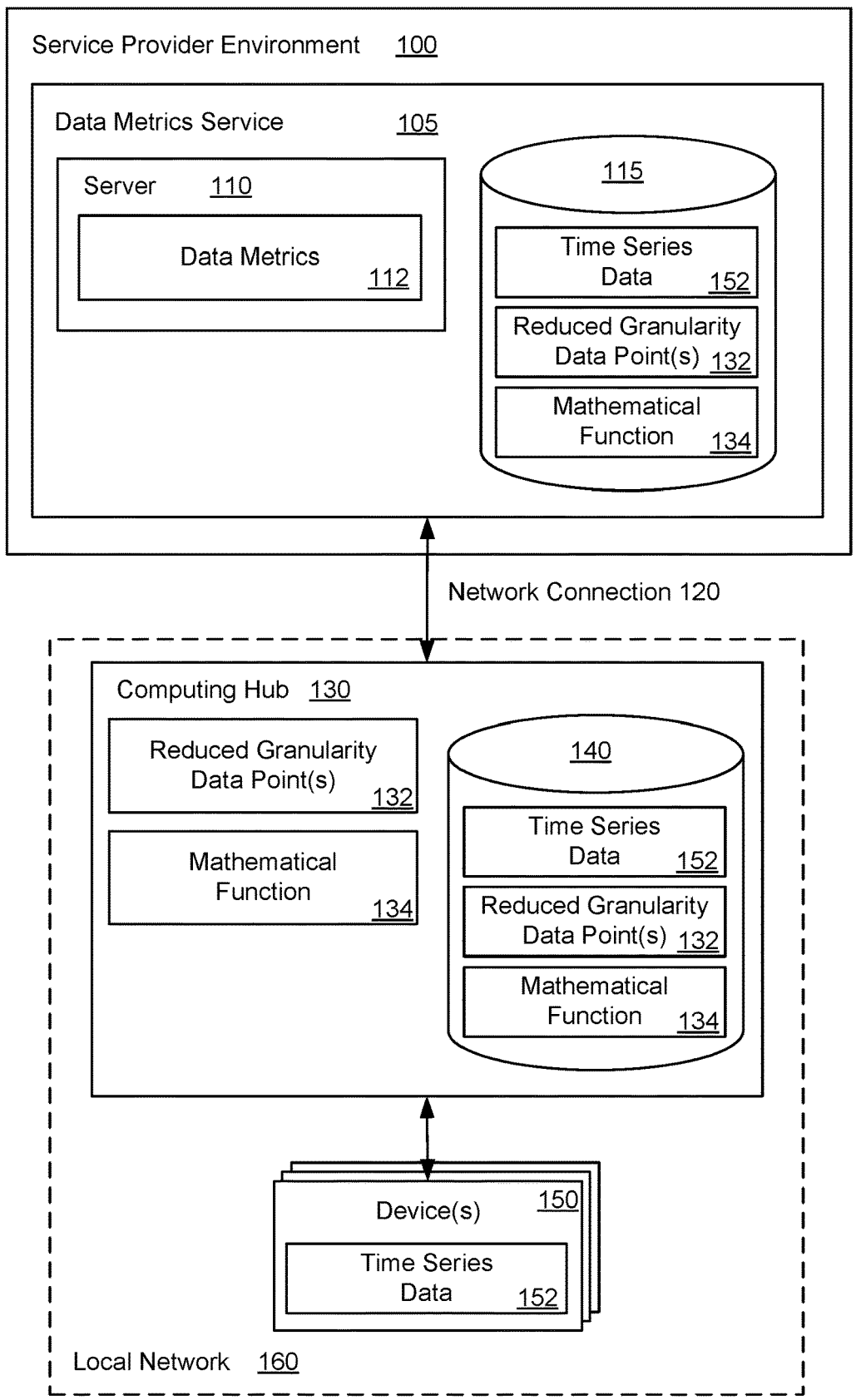
FIG. 1A illustrates a system and related operations for transmitting reduced granularity data points and/or a mathematical function that represents time series data captured while a network connectivity problem exists between a server and a computing hub according to an example of the present technology.

Technologies are described for transmitting reduced granularity data points from a computing hub to a server after a network connectivity problem for a computer network has been resolved (i.e., the connection has been re-established and/or network bandwidth has been restored) between the computing hub and the server. The reduced granularity data points may be an aggregation or a down sampling of time series data captured while the network connectivity problem exists between the computing hub and the server. The server may use the reduced granularity data points to compute various data metrics. The data metrics may include computed metric data, aggregated metric data, reporting data or some other type of metric data. Alternatively, a mathematical function that represents the time series data may be transmitted from the computing hub to the server after the network connectivity problem has been resolved, and the server may use the mathematical function to compute or determine time series data or data points that have not yet been sent to the service provider environment for the automated device. For example, the server may compute representative or estimated time series data points using the mathematical function, and then compute the data metrics using the representative or estimated time series data points. Rather than sending the entire time series data after the network connectivity problem is resolved, the server may receive the reduced granularity data points and/or the mathematical function immediately after the network connectivity problem has been resolved, which may enable the server to calculate the data points and/or data metrics in a more timely manner.

In one example, the granularity of time series data may be dynamically reduced based on conditions of a network over which the time series data is being transmitted. For example, if the network is operating at reduced capacity, the time series data may be downsampled to produce reduced granularity data points that are representative of the time series data. The reduced granularity data points may then be transmitted by a computing hub to a server over the degraded network to enable the server to use the reduced granularity data points to more quickly compute data metrics or make predictions based on the time series data. The computing hub may then transmit an increased granularity portion of the time series data after the reduced granularity data points are transmitted to the server, which may enable the server to refine or update the computed data metrics or the prediction, thereby enabling the data metrics or predictions to be more quickly determined based on the downsampled time series data and then the data metrics or predictions may be updated, if desired, as the granularity of the data is increased.

In another example, functions may be dynamically utilized to represent time series data based on conditions of a network over which the time series data is being transmitted. For example, if the network is operating at reduced capacity, a function may be determined that is representative of the time series data. The function may then be transmitted by a computing hub to a server over the degraded network to enable the server to use the function to more quickly compute data metrics or make predictions based on the time series data. The computing hub may then transmit actual portions of the time series data after the functions is transmitted, which may enable the server to refine or update the computed data metrics or the prediction, thereby enabling the data metrics or predictions to be more quickly determined based on the representative function of the time series data and then the data metrics or predictions may be updated, if desired, as the actual time series data is transmitted.

In one configuration, the computing hub may receive the time series data from a plurality of devices. The time series data may include raw sensor data captured by the devices, metric data, reporting data or some other type of IoT device data. For example, the computing hub and the devices may communicate over a local network, such as a wireless local area network (WLAN), and the devices may be IoT devices. The devices may capture time series data (e.g., temperature measurements every one second), and the devices may attempt to transmit the time series data to a server in a service provider environment via the computing hub. In other words, the computing hub may act as an intermediary between the server and the devices, and the computing hub may facilitate communication between the server and the devices. The computing hub may receive the time series data from the devices and locally store the time series data on a data store of the computing hub in preparation for the time series data to be transmitted to the server. For example, the data store may be a local buffer that temporarily stores the time series data while the time series data is being prepared for transmission to the server.

In one example, the computing hub may determine that a network connectivity problem exists for a computer network between the computing hub and the server that prevents the time series data from being electronically transmitted from the computing hub to the server. For example, the computing hub may determine that the network connectivity problem exists based on an occurrence of a connectivity condition. One example of a connectivity condition may be when a network data transfer rate to the server is below a defined threshold. Another example of a connectivity condition may be when an amount of time series data stored in the data store of the computing hub exceeds a defined threshold. Yet another example of a connectivity condition may be when a connection between the computing hub and the server is unavailable for any communications.

In one example, when a network connectivity problem exists between the computing hub and the server, the time series data that is being received from the devices may continue to be stored in the data store of the computing hub. In response to the network connectivity problem between the computing hub and the server, the computing hub may apply a downsampling function to the time series data to produce reduced granularity data points, where the reduced granularity data points may represent an approximation of the time series data. Alternatively, an aggregation function, an interpolation function or an algebraic function may be applied. The reduced granularity data points may represent an aggregation of the time series data, an interpolation of the time series data, a down sampling of the time series data or another mathematical reduction of the time series data. Therefore, for time series data that is being received while the network connectivity problem exists between the computing hub and the server, that time series data may be reduced or simplified by applying the downsampling function to the time series data.

In one example, the computing hub may determine that the network connectivity problem between the computing hub and the server has been resolved. The network connectivity problem may be considered to be resolved or restored when the network data transfer rate to the server is above a defined threshold, when an amount of time series data stored in the data store of the computing hub is less than a defined threshold, or when a connection between the computing hub and the server is available for any communications. At this time, the computing hub may transmit the reduced granularity data points to the server. The server may use the reduced granularity data points, in lieu of the time series data, to compute various metrics for the devices.

In an alternative configuration, when the network connectivity problem exists between the computing hub and the server, the computing hub may calculate a mathematical function that represents the time series data received from the devices. For example, the mathematical function that represents the time series data may be a curve fitting function or an aggregation function. The mathematical function may be a linear function, polynomial function, quadratic function, exponential function, sinusoidal function, etc. After the network connectivity problem between the computing hub and the server has been resolved, the computing hub may transmit the mathematical function to the server. In this case, the computing hub may send the mathematical function without sending the time series data. The server may use the mathematical function, in lieu of the time series data, to compute various metrics for the devices.

FIG. 1A illustrates an example of a system and related operations for transmitting reduced granularity data points 132 and/or a mathematical function 134 that represents time series data 152 captured while a network connectivity problem exists between a server 110 and a computing hub 130. A plurality of devices 150 (e.g., IoT devices or other automation devices) may capture the time series data 152. The time series data 152 may include periodic sensor readings (e.g., temperature measurements in one-second intervals, moisture measurements in 10-second intervals, metrics, feedback data, uptime data, etc.). The devices 150 may transmit the time series data 152 to the computing hub 130, where the devices 150 and the computing hub 130 may be included in a local network 160, such as a WLAN. The computing hub 130 may act as an intermediary between the devices 150 and the server 110 in a service provider environment 100. For example, the devices 150 may send the time series data 152 to the server 110 via the computing hub 130.

In one example, the computing hub 130 may receive the time series data 152 from the devices 150, and the computing hub 130 may store the time series data 152 in a data store 140 of the computing hub 130. The data store 140 may be a data buffer that temporarily stores the time series data 152 in preparation for the time series data 152 to be transmitted to the server 110. For example, when a network connection 120 between the computing hub 130 and the server 110 is available, the time series data 152 may be temporarily stored in the data store 140 before being transmitted to the server 110.

In one example, the computing hub 130 may determine that a network connectivity problem exists between the computing hub 130 and the server 110 that prevents the time series data from being electronically transmitted from the computing hub 130 to the server 110. For example, the computing hub 130 may determine that a network data transfer rate to the server 110 is below a defined threshold (e.g., the network data transfer rate to the server 110 is below a defined number of kilobits/second or a defined number of megabits per second). In another example, the computing hub 130 may determine that an amount of time series data 152 stored in the data store 140 exceeds a defined threshold. For example, the data store 140 (e.g., a data buffer) may begin to fill up with the time series data 152, thereby indicating that the time series data 152 is not being emptied from the data store 140 because there is a network connectivity problem. In yet another example, the computing hub 130 may determine that the network connection 120 between the computing hub 130 and the server 110 is unavailable for network communications.

In one example, while the network connectivity problem exists between the computing hub 130 and the server 110, the computing hub 130 may apply a downsampling function to the time series data 152 to produce reduced granularity data points 132. The reduced granularity data points 132 may represent an approximation of the time series data 152 to be transmitted to the server 110 while the network connectivity problem exists with the server 110. The reduced granularity data points 132 may be stored in the data store 140 of the computing hub 130 after the reduced granularity data points 132 are computed. Alternatively, an aggregation function, an interpolation function or another algebraic function may be applied to the time series data. Some examples of aggregation functions may include an average function, a count function, a maximum, median or minimum, a mode function, a range function, a sum function, etc. The reduced granularity data points 132 may represent an aggregation of the time series data 152 or a down sampling of the time series data 152. In one example, the downsampling function to be applied to the time series data 152 may be selected based on an instruction received via a user interface. For example, an instruction received via the user interface may define a level or rate of downsampling to be applied to the time series data 152. For example, an instruction received via the user interface may specify that the time series data 152 may be downsampled at a rate of 10% or 20% to produce the reduced granularity data points 132. In another example, a downsampling function that applies a defined level or rate of downsampling may be selected by a user or based on the network connectivity problem. For example, a downsampling function having a bandwidth reduction of 50% may allow for a higher resolution of the time series data 152 to be sent as compared to a bandwidth reduction of 75% which would send lower resolution initially as compared to the 50% bandwidth reduction. Bandwidth reduction can also be measured in terms of granularity of the data (e.g., increased or decreased granularity). The bandwidth reduction may be adjusted depending on the network connectivity problem. The computing hub 130 may continue to apply and/or modify the downsampling function to incoming time series data while the network connectivity problem exists, and during the network connectivity problem (e.g., partial connectivity issues) or after the network connectivity problem has been resolved, the computing hub 130 may transmit the reduced granularity data points 132 to the server 110. For example, the computing hub 130 may retrieve the reduced granularity data points 132 from the data store 140 of the computing hub 130 and transmit the reduced granularity data points 132 to the server 110.

As a non-limiting example, while the network connectivity problem exists between the computing hub 130 and the server 110, the computing hub 130 may receive 100 time series data points over a 10 second time period (i.e., a new time series data point may be received every 0.1 seconds). The computing hub 130 may apply an aggregation function or a down sampling function on the 100 time series data points received to produce a reduced set consisting of five sensor data points. In other words, the 100 time series data points may be represented using the five sensor data points after the aggregation function or down sampling function is applied. One example of a down sampling function would be to send a data point for every 2 seconds in the time series data. After the network connectivity problem has been resolved, the computing hub 130 may transmit the five sensor data points to the server 110. In another example, the computing hub 130 may transmit a single sensor data point to the server 110, where the single sensor data point may represent or encompass the 100 time series data points.

In an alternative configuration, while the network connectivity problem exists between the computing hub 130 and the server 110, the computing hub 130 may calculate a mathematical function 134 that represents the time series data 152 received from the devices 150. The mathematical function 134 may be a curve function or "best fit" line created by curve fitting or the function may be an aggregation function. In other words, the computing hub 130 may calculate a mathematical function 134 (e.g., a linear function, polynomial function, a curve, etc.) that most closely fits or resembles the time series data 152. The mathematical function 134 may be stored in the data store 140 of the computing hub 130 after the mathematical function 134 has been derived, estimated or computed. The computing hub 130 may calculate and update the mathematical function 134 while the network connectivity problem exists, and after the network connectivity problem has been resolved, the computing hub 130 may transmit the mathematical function 134 to the server 110 and stop computing the mathematical function. For example, the computing hub 130 may retrieve the mathematical function 134 from the data store 140 of the computing hub 130 and transmit the mathematical function 134 to the server 110.

As a non-limiting example, while the network connectivity problem exists between the computing hub 130 and the server 110, the computing hub 130 may receive 100 time series data points over a 10 second time period (i.e., a new time series data point may be received every 0.1 seconds). The computing hub 130 may determine that a mathematical function of y=3x+1 most closely fits or resembles the 100 time series data points, where x corresponds to a horizontal axis and y corresponds to a vertical axis. In other words, the 100 time series data points may be represented using the mathematical function of y=3x+1 based on a curve fitting process or similar mechanism being applied to the 100 time series data points. After the network connectivity problem has been resolved, the computing hub 130 may transmit the mathematical function of y=3x+1 to the server 110. In this example, the computing hub 130 may not transmit the 100 time series data points to the server 110, but rather the mathematical function of y=3x+1 which is representative of the path of the 100 time series data points.

In one configuration, a data metrics service 105 operating on the server 110 may receive the reduced granularity data points 132 and/or the mathematical function 134 from the computing hub 130 over the network connection 120 after the network connectivity problem has been resolved between the computing hub 130 and the server 110. The data metrics service 105 may include a data store 115 to store the reduced granularity data points 132 and/or the mathematical function 134. Further, the data store 115 may store the time series data 152, which may be transmitted to the data metrics service 105 after the reduced granularity data points 132 and/or the mathematical function 134 are transmitted to the data metrics service 105. The data metrics service 105 may calculate data metrics 112 for the devices 150 based on the reduced granularity data points 132 and/or the mathematical function 134 received from the computing hub 130. For example, the data metrics service 105 may compute representative or estimated time series data points using the mathematical function 134, and then compute the data metrics 112 using the representative or estimated time series data points. The data metrics 112 may be recalculated and updated over time based on the most recent information received from the computing hub 130. Once all the raw data is received from the computing hub 130 then the estimated data can be discarded.

In one example, after the network connectivity problem is resolved and the reduced granularity data points 132 and/or the mathematical function 134 are transmitted to the server 110, the computing hub 130 may also transmit the time series data 152 to the server 110. However, since the data metrics service 105 may initially calculate the data metrics 112 using the reduced granularity data points 132 and/or the mathematical function 134, the time series data 152 may have a reduced priority level as compared to new time series data that is received at the computing hub 130. For example, the computing hub 130 may transmit the reduced granularity data points 132 and/or the mathematical function 134 to the server 110, and then may transmit the new time series data to the server 110. If the network connectivity between the computing hub 130 and the server 110 is favorable, the computing hub 130 may then transmit the delayed time series data 152 to the server 110. The new time series data and the delayed time series data 152 may be stored in the data store 115 which is accessible to the data metrics service 105.

As a non-limiting example, the time series data 152 may be transmitted to the server 110 at a lower resolution and then higher resolution data points (i.e., increased time resolution) may be transmitted to the server 110 based on available bandwidth. For example, after transmitting the reduced granularity data points 132 and/or the mathematical function 134 and the new time series data to the server 110, the computing hub 130 may transmit a low resolution of the time series data 152 (i.e., a lower time resolution for the time series data) which may contain 10% of the time series data 152, and then a medium resolution of the time series data 152 which may contain 50% of the time series data 152 based on the available bandwidth, and then a high resolution of the time series data 152 which may contain 100% of the time series data 152 based on the available bandwidth.

Figure 1B:
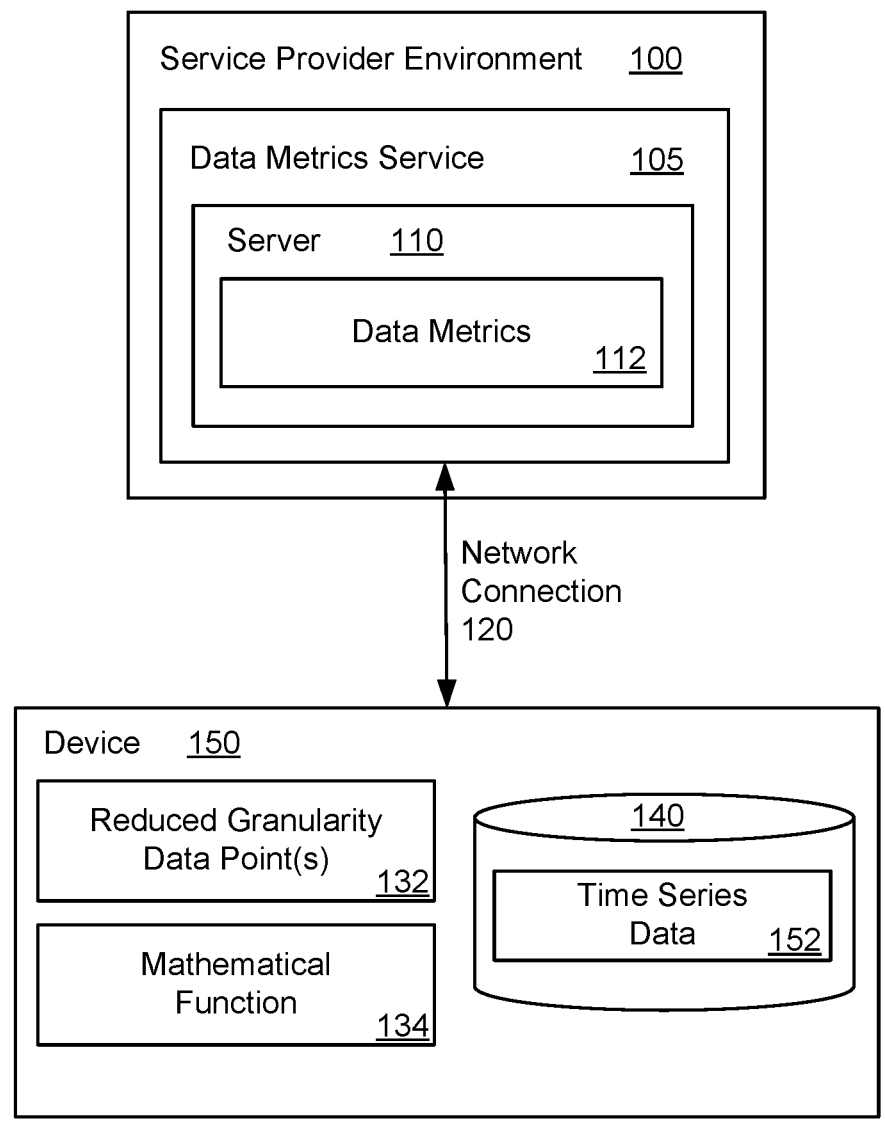
FIG. 1B illustrates a system and related operations for transmitting reduced granularity data points and/or a mathematical function that represents time series data captured while a network connectivity problem exists between a server and a device according to an example of the present technology.

FIG. 1B illustrates an example of a system and related operations for transmitting reduced granularity data points 132 and/or a mathematical function 134 that represents time series data 152 captured while a network connectivity problem exists between a server 110 and device(s) 150. In this configuration, the devices 150 that capture the time series data 152 may have sufficient computational capacity and network capability to send the time series data 152 directly to the server 110. In this configuration, the devices 150 may not use a computing hub 130, but may have the ability to communicate directly with the server 110. In this configuration, a device 150 may capture the time series data 152, and after detecting that a network connectivity problem exists with the server 110, the device 150 may calculate reduced granularity data points 132 and/or a mathematical function 134, which may be transmitted from the device 150 to the server 110 after the network connectivity problem has been resolved.

In one example, the computing hub 130 and/or the devices 150 may be located or installed in a geographic location or network location having poor connectivity or intermittent connectivity issues. For example, the computing hub 130 and/or the devices 150 may be located or installed on a farm, a moving platform such as a truck, in a factory, or another area that is prone to data loss. As a result, network connectivity problems can intermittently exist for the computing hub 130 and/or the devices 150, and during this time, time series data 152 that is captured may be unable to be transmitted to the server 110 until the network connectivity problem has been resolved.

In past solutions, when a network connectivity problem would occur, a computing hub would continue to store time series data in a data store (e.g., the data buffer). After the network connectivity problem was resolved, the computing hub would begin transmitting the time series data from the data store to a server at a point in the time series data where data transfer was interrupted. However, sending the missing time series data to the server after the network connectivity problem has been resolved may take an undue amount of time and may provide gaps in the knowledge of an administrator monitoring the devices for an unknown period of time. Further, the server may compute composite data metrics based on the time series data, and the server may be unable to calculate the composite data metrics until the time series data is completely received from the computing hub. As a result, the server may go for extended periods of time without being able to calculate the composite data metrics or may calculate data metrics that are of reduced accuracy. Further, in past solutions, the time series data would resume transmission after the network connectivity problem was resolved, but new time series data would constantly be captured and loaded into the data store in preparation for transmission to the server. Thus, in past solutions, there would be competition for available resources created between the time series data that was delayed from being transmitted due to the network connectivity problem and the new time series data that was received from the devices. In the past, if the new time series data were to be transmitted in a delayed manner due to the competition for available resources, the data metrics that were being calculated at the server would be further affected because the newest time series would be unavailable because the new time series data was not being received in a timely manner due to congestion caused by trying to send older data too.

In the present technology, due to network connectivity problems that may occur from time to time, the computing hub may not transmit the older time series data during these times. Rather, the computing hub may calculate reduced granularity data points and/or a mathematical function that represents the time series data. The reduced granularity data points and/or the mathematical function may have a data size that is much smaller than the time series data. After the network connectivity problem has been resolved, the computing hub may immediately transmit the reduced granularity data points and/or the mathematical function to the server, without actually transmitting the entire set of older time series data. The reduced granularity data points and/or the mathematical function may allow the server to quickly compute an estimate of the data metrics for the time period in which the network connectivity problem existed, without having to wait for the entire set of time series data. Further, by not sending the time series data along with the reduced granularity data points and/or the mathematical function, the computing hub may conserve resources to send new time series data that is newly received at the computing hub from the devices after the network is available again. As a result, the network connectivity problem that existed may avoid a negative carryover effect on obtaining the new time series data at the server as typically done when there is no connectivity problem.

Figure 2:
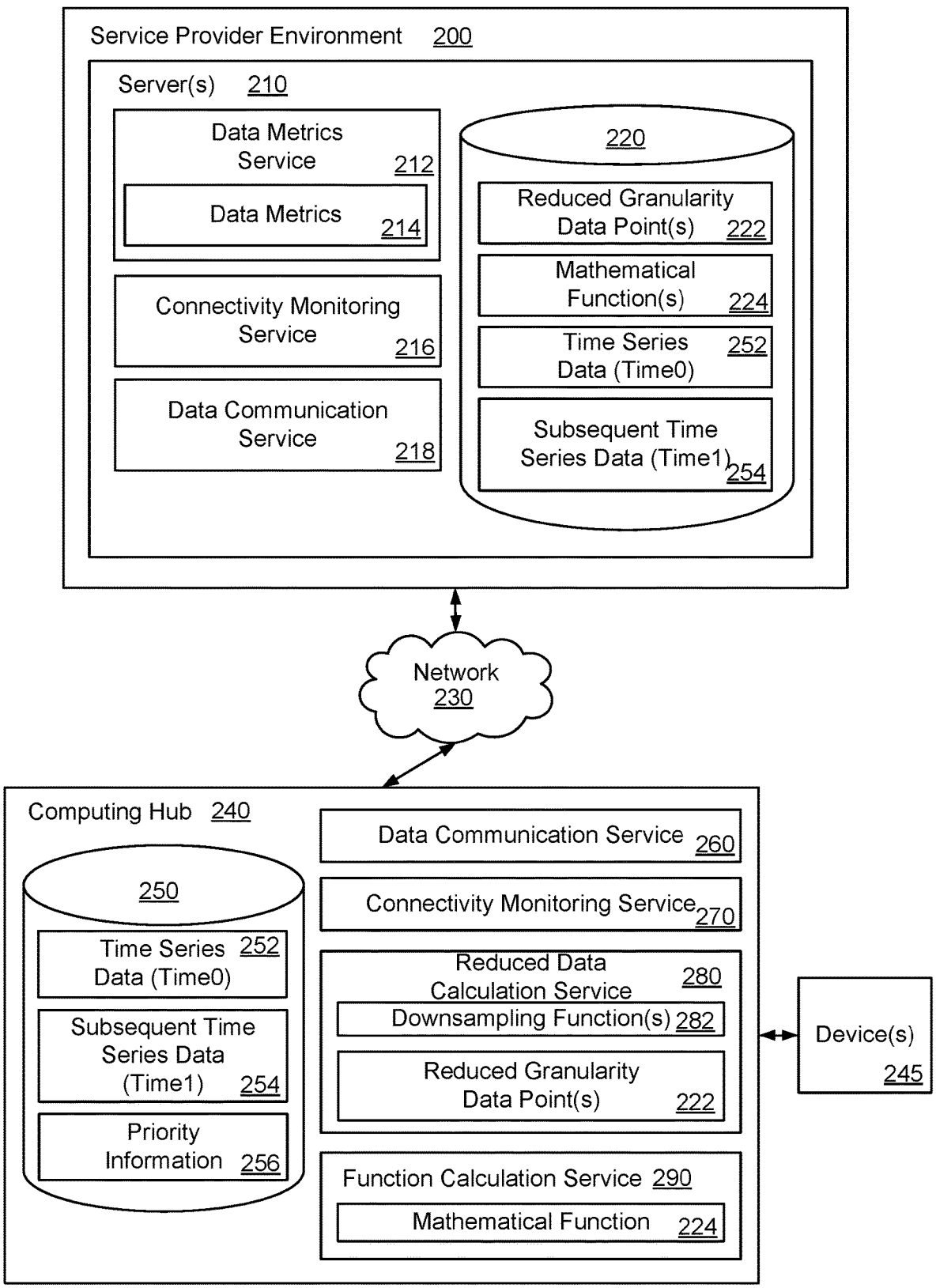
FIG. 2 is an illustration of a networked system for receiving reduced granularity data points and/or a mathematical function that represents time series data captured while a network connectivity problem exists between a server and a computing hub according to an example of the present technology.

FIG. 2 illustrates example components of the present technology in a service provider environment 200. The service provider environment 200 may include a server 210 operable to receive reduced granularity data points 222 and/or a mathematical function 224 that represents time series data 226 captured while a network connectivity problem exists between a server 210 and a computing hub 240. For example, the computing hub 240 may receive the time series data 226 from a plurality of devices 245, such as IoT devices. The computing hub 240 may calculate the reduced granularity data points 222 and/or the mathematical function 224 using the time series data 226. The computing hub 240 may transmit the reduced granularity data points 222 and/or the mathematical function 224 over a network 230 to the server 210, where the reduced granularity data points 222 and/or the mathematical function 224 may be used by the server 210 to compute data point replacements or data point estimates and/or compute data metrics 214 using the reduced granularity data points 222 and/or representative data points deduced from or computed using the mathematical function 224.

In one example, the computing hub 240 may include a data store 250 that includes the time series data 252. The time series data 252 may be associated with a first time period (Time Period 0). The time series data 252 may be sensor data associated with a certain type of sensor, including but not limited to, a temperature sensor, moisture sensor, pressure sensor, acceleration sensor, light sensor, etc. In one example, the time series data 252 may include a plurality of time stamps, and for a given time stamp, corresponding sensor data value(s). In another example, the time series data 252 may include metric data, reporting data or some other type of IoT data. The data store 250 may further include subsequent time series data 254, which may be associated with a second time period (Time Period 1). The subsequent time series data 254 may be received later in time as compared to the time series data 252 in the first time period.

In one example, the computing hub 240 may include the data store 250 that includes priority information 256. The priority information 256 may define a priority level for different types of information that may be transmitted from the computing hub 240 to the server 210 after a network connectivity problem has been resolved between the computing hub 240 and the server 210. For example, the priority information 256 may define that the reduced granularity data points 222 and the mathematical function 224 are assigned a first priority level after the network connectivity problem has been resolved. Further, the priority information 256 may define that the subsequent time series data 254 may be assigned a second priority level after the network connectivity problem has been resolved. In addition, the priority information 256 may define that the time series data 252 (which could not be transferred due to the network connectivity problem) may be assigned a third priority level after the network connectivity problem has been resolved. Therefore, in this example, the subsequent time series data 254 may be assigned a higher priority as compared to the time series data 252, in order to make the most recent data available as soon as possible. Then older data that could not be sent due to the network connectivity issues can be sent later as bandwidth is available.

The computing hub 240 may utilize a number of services for calculating the reduced granularity data points 222 and/or the mathematical function 224. For example, the computing hub 240 may operate a data communication service 260, a connectivity monitoring service 270, a reduced data calculation service 280, a function calculation service 290, and other applications, modules, processes, systems, engines, or functionality not discussed in detail herein.

The data communication service 260 may communicate time series data 252 to the server 210 when there is no network connectivity problem between the computing hub 240 and the server 210. The data communication service 260 may receive the time series data 252 from the devices 245, and then forward the time series data 252 to the server 210.

The connectivity monitoring service 270 may monitor a connectivity between the computing hub 240 and the server 210. For example, the connectivity monitoring service 270 may determine that a network connectivity problem exists between the computing hub 240 and the server 210 that prevents the time series data 252 from being electronically transmitted from the computing hub 240 to the server 210. For example, the connectivity monitoring service 270 may determine that a network data transfer rate from the computing hub 240 to the server 210 is below a defined threshold. In another example, the connectivity monitoring service 270 may determine that an amount of time series data 252 stored in the data store 250 exceeds a defined threshold. This threshold may be addressed by measuring a specific value for time series data being stored, such as the amount of time series data being stored is greater than 1 megabyte or 4 megabytes, or a threshold or threshold ratio may be measured by determining that the buffer from the time series sensor may be receiving data at 200% of the rate it is being sent to the service provider environment 200 and so this exceeds a transfer threshold ratio. In yet another example, the connectivity monitoring service 270 may determine that a network connection between the computing hub 240 and the server 210 is unavailable for communications.

The reduced data calculation service 280 may apply a downsampling function 282 to the time series data 252 to produce the reduced granularity data points 222. The reduced data calculation service 280 may apply the downsampling function 282 when the network connectivity problem exists between the computing hub 240 and the server 210. In other words, an occurrence of the network connectivity problem may serve as a trigger for applying the downsampling function 282. As an alternative to the downsampling function 282, an aggregation function, an interpolation function or another algebraic function may be applied. The reduced granularity data points 222 that are produced as a result may represent an approximation of the time series data 252. In other words, the reduced granularity data points 222 may represent an aggregation of the time series data 252, an interpolation of the time series data 252 or a down sampling of the time series data 252. Further, the reduced granularity data points 222 may have a reduced data size in comparison to the total time series data 252.

The function calculation service 290 may calculate or fit a mathematical function 224 that represents the time series data 252. The function calculation service 290 may compute or fit the mathematical function to the time series data 252 when the network connectivity problem exists between the computing hub 240 and the server 210. The mathematical function 224 may be a curve fitting function or an aggregation function. Some examples of aggregation functions may include an average function, a count function, a maximum, median or minimum, a mode function, a range function, a sum function, etc. In other words, the mathematical function 224 may be selected or derived based on a best fit line or curve to the time series data 252. Further, the mathematical function 224 may have a reduced data size for describing the mathematical function 224 in comparison to the data size of the time series data 252.

The data communication service 260 operating on the computing hub 240 may transmit the reduced granularity data points 222 and/or the mathematical function 224 to the server 210.

In one configuration, the server 210 may include a data store 220 that includes the reduced granularity data points 222, the mathematical function(s) 224, the time series data 252 and the subsequent time series data 254. The server 210 may also include a connectivity monitoring service 216 to monitor a connectivity between the computing hub 240 and the server 210. The server 210 may include a data communication service 218 to receive the time series data 252, the subsequent time series data 254, the reduced granularity data points 222 and/or the mathematical function(s) 224 received from the computing hub 240.

In one example, the server 210 may include a data metrics service 212 operable to calculate data metrics 214 using the reduced granularity data points 222 and/or the mathematical function 224. The data metrics 214 may be calculated using the reduced granularity data points 222 and/or the mathematical function 224 instead of based on the time series data 252. For example, the data metrics service 212 may compute the data metrics 214 using the reduced granularity data points 222, or alternatively, the data metrics service 212 may compute representative, temporary or estimated time series data points using the mathematical function 224 and then compute the data metrics 214 using the representative, temporary or estimated time series data points. The data metrics 214 may be composite data metrics that are periodically calculated for the devices 245 based on the reduced granularity data points 222 and/or the mathematical function 224, which may be received in lieu of the time series data 252 produced by the devices 245 due to the network connectivity problem. The data metrics 214 may include aggregation metrics or other types of metrics that are performed using the reduced granularity data points 222 and/or the mathematical function 224. Since the reduced granularity data points 222 and/or the mathematical function 224 are substantially smaller in data size as compared to the time series data 252, the data metrics service 212 may quickly receive and calculate the data metrics 214 as compared to if the delayed time series data 252 were used to calculate the data metrics 214.

While an accuracy level of the data metrics 214 may be decreased when using the reduced granularity data points 222 and/or the mathematical function 224 as compared to the time series data 252, an ability to quickly calculate the data metrics 214 albeit with lower accuracy may be preferable as compared to waiting an undue amount of time to receive the time series data 252 and then perform the data metrics calculation. However, after the data metrics 214 are calculated using the reduced granularity data points 222 and/or the mathematical function 224, the data metrics service 212 may update the data metrics 214 over a period of time based on receipt of the time series data 252. In other words, the time series data 252 may be received over a period of time, and the data metrics 214 may be updated to reflect an improved accuracy level based on the time series data 252 that is received later in time.

In one configuration, the computing hub 240 may receive the subsequent time series data 254 after the network connectivity problem has been resolved and after the reduced granularity data points 222 and/or the mathematical function 224 has been transmitted to the server 210. In this case, based on the priority information 256, the subsequent time series data 254 (i.e., the newer time series data) may be prioritized over the time series data 252 that was previously received at the computing hub 240. In other words, the computing hub 240 may send the subsequent time series data 254 to the server 210 and wait to send the delayed time series data 252 until sufficient resources are available, which may be aligned with the priority information 256 in the data store 250. Since the computing hub 240 may have already sent the reduced granularity data points 222 and/or the mathematical function 224 to the server 210, which are a representation of the time series data 252, the transmission of the delayed time series data 252 in a raw data form may have a reduced priority. When network resources are available, the raw data form of the time series data 252 may be transmitted to the server 210 and the data metrics 214 calculated by the data metrics service 212 may be adjusted based on the time series data 252. For example, an accuracy level of the data metrics 214 may be improved based on having the full time series data 252, as compared to previously when the data metrics 214 were calculated using the reduced granularity data points 222 and/or the mathematical function 224.

In one configuration, the server 210 may assign quality tags to the reduced granularity data points 222 and the time series data 252, and the server 210 may provide a graphical user interface (GUI) to a user computing device associated with the computing hub 240 and/or the devices 245 that allows data to be displayed based on quality tags. For example, the server 210 may assign a first quality tag to the reduced granularity data points 222 that represent the time series data 252. For example, the first quality tag may be labeled as 'uncertain' or 'estimated'. The server 210 may assign a second quality tag to the time series data 252 and a third quality tag to the subsequent time series data 254, where the second quality tag and the third quality tag may both be labeled as 'good' or 'full detail'. The server 210 may provide the GUI to allow users to retrieve and view certain time series data and/or the reduced granularity data points 222 with quality tag references.

In one configuration, the computing hub 240 may also be referred to as an edge device, computing node or communication hub. The computing hub 240 may provide an entry point into enterprise or service provider core networks. The computing hub 240 may include a wireless gateway, a router, a network hub, a traffic aggregation device, a central office and/or a wireless access point to the internet, other networks, and/or a distributed computing power of the service provider environment 200.

The computing hub 240 may host application(s) for the device(s) 245. Non-limiting examples of the application(s) may include analytics applications, industrial management applications (e.g., manufacturing floor applications), agriculture applications, connected and autonomous vehicle management applications, video caching and processing applications, augmented reality (AR)/virtual reality (VR) applications, etc. The computing hub 240 may include local compute functions, which may be instructions for execution at the computing hub 240. The local compute functions may be similar to compute code functions that may be executed in a compute service in the service provider environment 200. For example, containers and/or computing instances may be provided in the computing hub 240, and the local compute functions or compute code functions may be executed or launched using a local compute service in the computing hub 240. The local compute functions or compute code functions may be portions of code that may be executed using the local compute service at a request of the devices 245, and return results may be provided to the devices 245. The local compute functions may be functions that launch in a container (e.g., on a computing instance) of the computing hub 240 and are segments of program code that are capable of receiving parameters, performing processing, and returning values. In addition, the local compute functions may be terminated at the computing hub 240 once the local compute codes return values.

In one example, the computing hub 240 may further include a cache for storing device reporting data or state data from the devices 245 while the service provider environment 200 is inaccessible through a computer network. When a network connection to the service provider environment 200 becomes accessible again, the device data or state data may be uploaded from the cache to the service provider environment 200. In another example, the computing hub 240 may further include messaging services for providing messaging between the devices 245. In yet another example, the computing hub 240 may further include a syncing service that is used to sync data and device states from the devices 245 to shadow device states in the service provider environment 200. More specifically, the computing hub 240 may cache the state of the devices 245, using a virtual version, or "shadow," of each device 245, which tracks the device's current versus a desired state. These localized shadow states may be synchronized with shadow states in the service provider environment 200.

The devices 245 (e.g., IoT devices) may be, for example, processor-based systems or embedded systems. As non-limiting examples, the devices 245 may include consumer products (e.g., rice cookers, televisions, printers, or scanners), home automation products (e.g., smart thermostats, smart refrigerators, heating, air conditioning, etc.), manufacturing devices, farming devices, factory devices, industrial metal stamping devices, industrial robots, sensors, drones, or other devices that are assigned unique identifiers and are capable of communicating data over the network 230. Commercial devices may also be included in the definition of the device 245, including: commercial printing presses, commercial freezers, commercial kilns, commercial mixers or other commercial equipment. The devices 245 may be other types of embedded devices that provide electronic controls for a machine or system.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 230 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An application programming interface (API) may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3A:
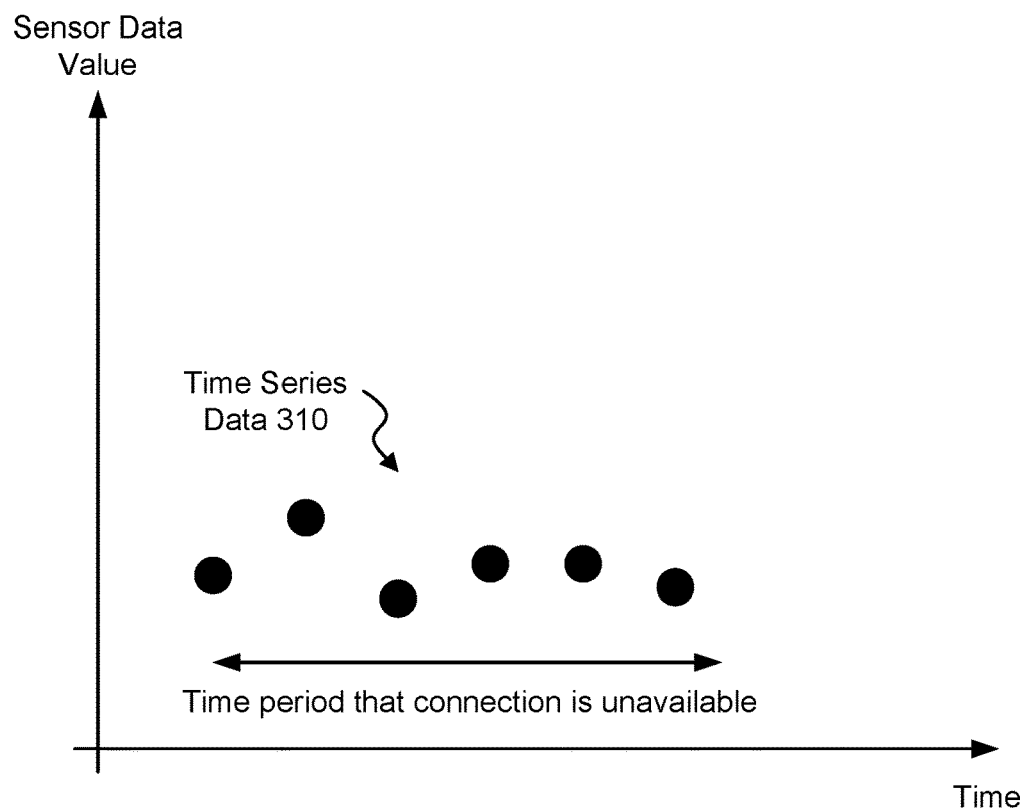
FIG. 3A is a graphical representation of time series data captured over a time period in which a network connection between a server and a computing hub is unavailable according to an example of the present technology.

FIG. 3A is an example of a graphical representation of time series data 310 captured over a time period in which a connection between a server and a computing hub is unavailable. In this example, the time series data 310 may include six sensor data points, which may be received during the time period in which the network connection between the server and the computing hub is unavailable. A given sensor data point may be associated with a sensor value and a corresponding time point or time code. As shown, each sensor data point may have a distinct value.

Figure 3B:
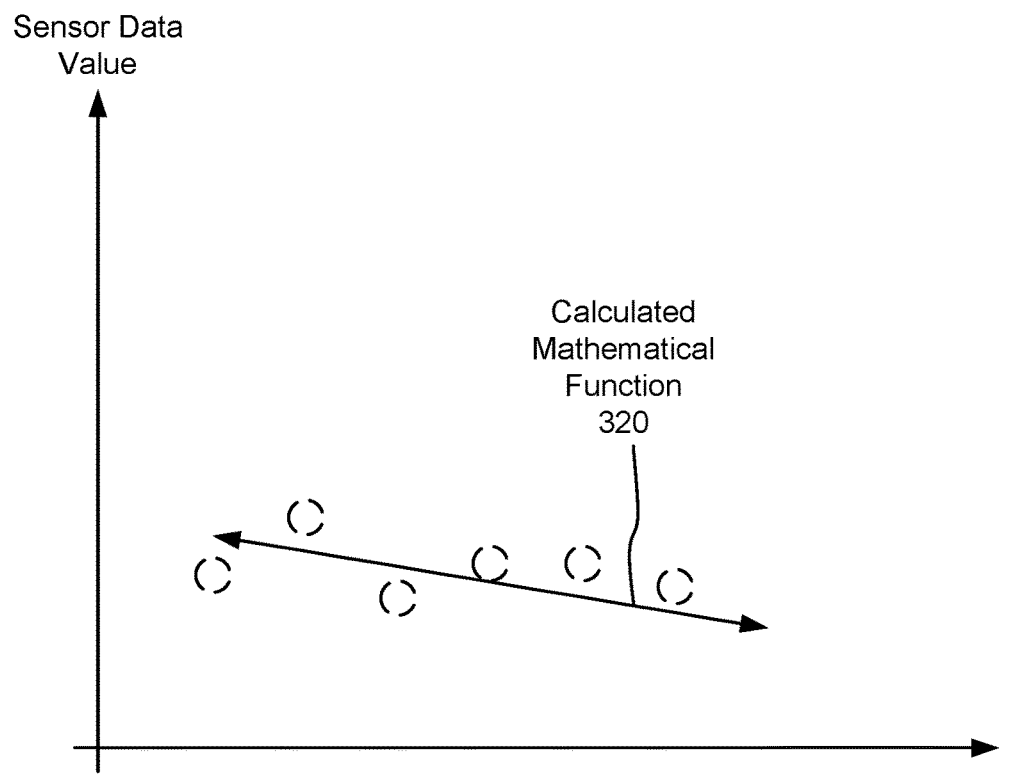
FIG. 3B illustrates a mathematical function calculated to fit time series data according to an example of the present technology.

FIG. 3B illustrates an example of a mathematical function 320 calculated to fit to the time series data. A computing hub may calculate the mathematical function 320 to best fit the time series data. In this example, the mathematical function 320 may be a linear function that corresponds to the six sensor data points included in the time series data 310. Alternatively, depending on the time series data, the mathematical function 320 may be a polynomial function, a quadratic function, an exponential function, a sinusoidal function, or any appropriate function that fits to the data.

Figure 4A:
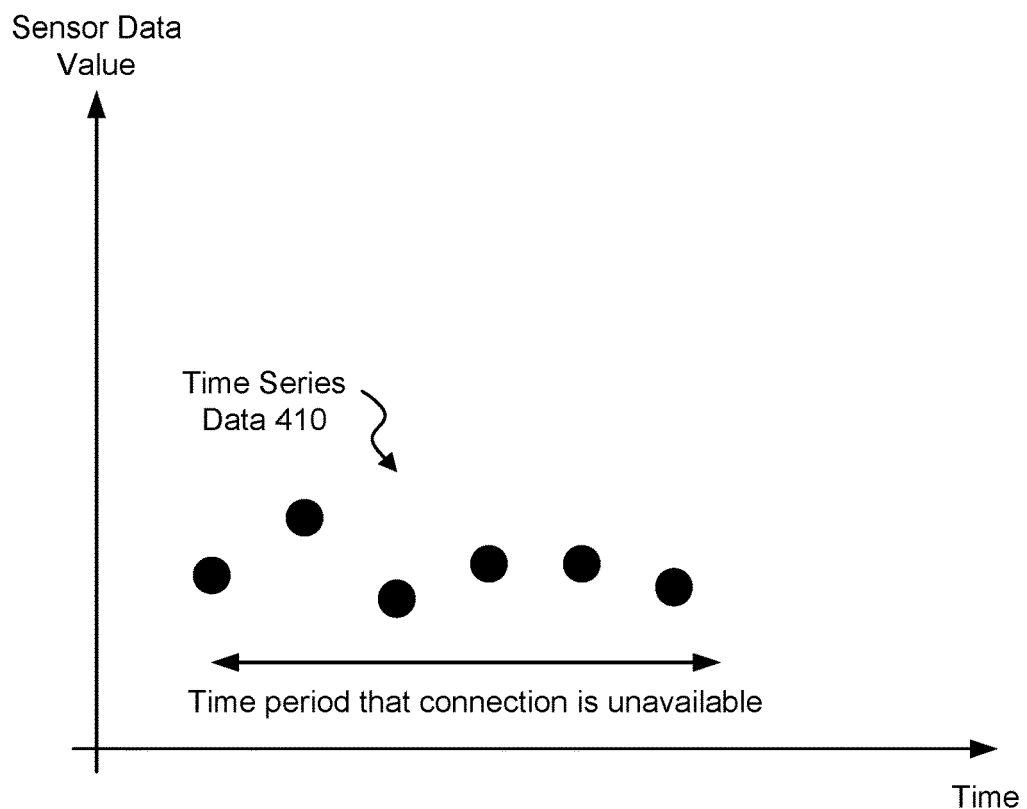
FIG. 4A is a graphical representation of time series data captured over a time period in which a network connection between a server and a computing hub is unavailable according to an example of the present technology.

FIG. 4A is an example of a graphical representation of time series data 410 captured over a time period in which a connection between a server and a computing hub is unavailable. In this example, the time series data 410 may include six sensor data points, which may be received during the time period in which the network connection between the server and the computing hub is unavailable. A given sensor data point may be associated with a sensor value and a corresponding time point or time code.

Figure 4B:
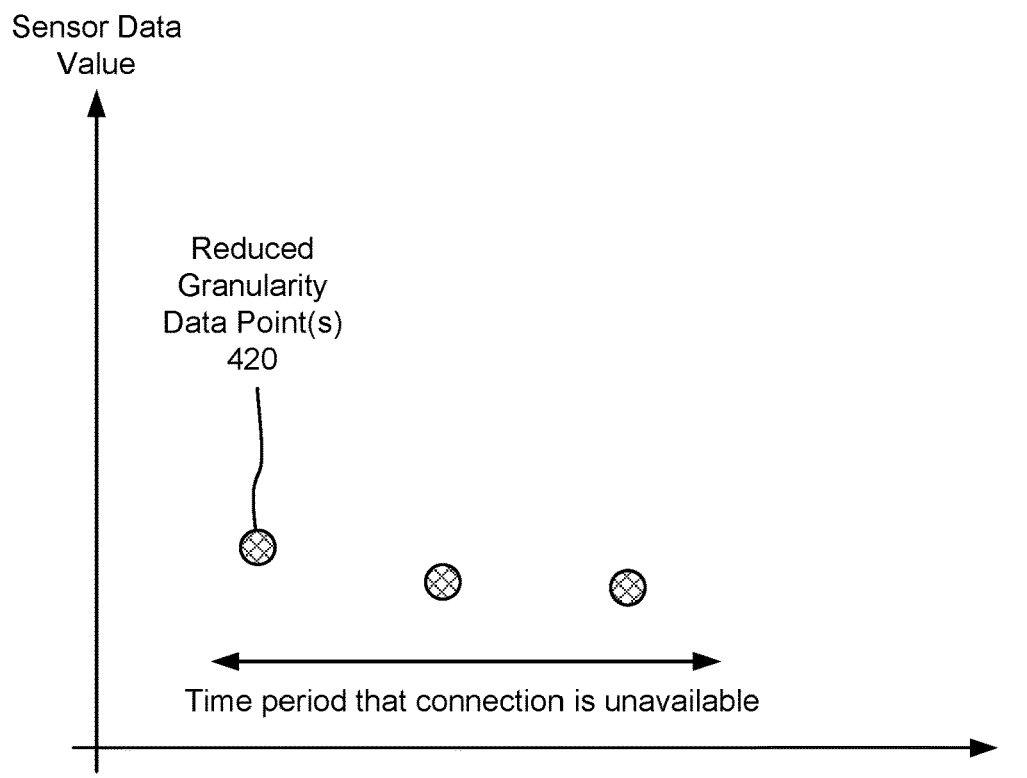
FIG. 4B illustrates reduced granularity data points derived from time series data according to an example of the present technology.

FIG. 4B illustrates an example of a reduced number of sensor data points 420 derived from the time series data. A computing hub may calculate the reduced granularity data points 420 by applying a downsampling function or an aggregation function to the time series data. The downsampling function or aggregation function may be applied to reduce the number of sensor data points and obtain aggregated sensor data points, such that the aggregated sensor data points may be representative of the original number of sensor data points in the time series data. In this example, the reduced granularity data points 420 may include three sensor data points (i.e., six sensor data points may be reduced to three sensor data points). Alternatively, the reduced granularity data points 420 that are derived from the time series data may consist of one or two sensor data points.

Figure 5:
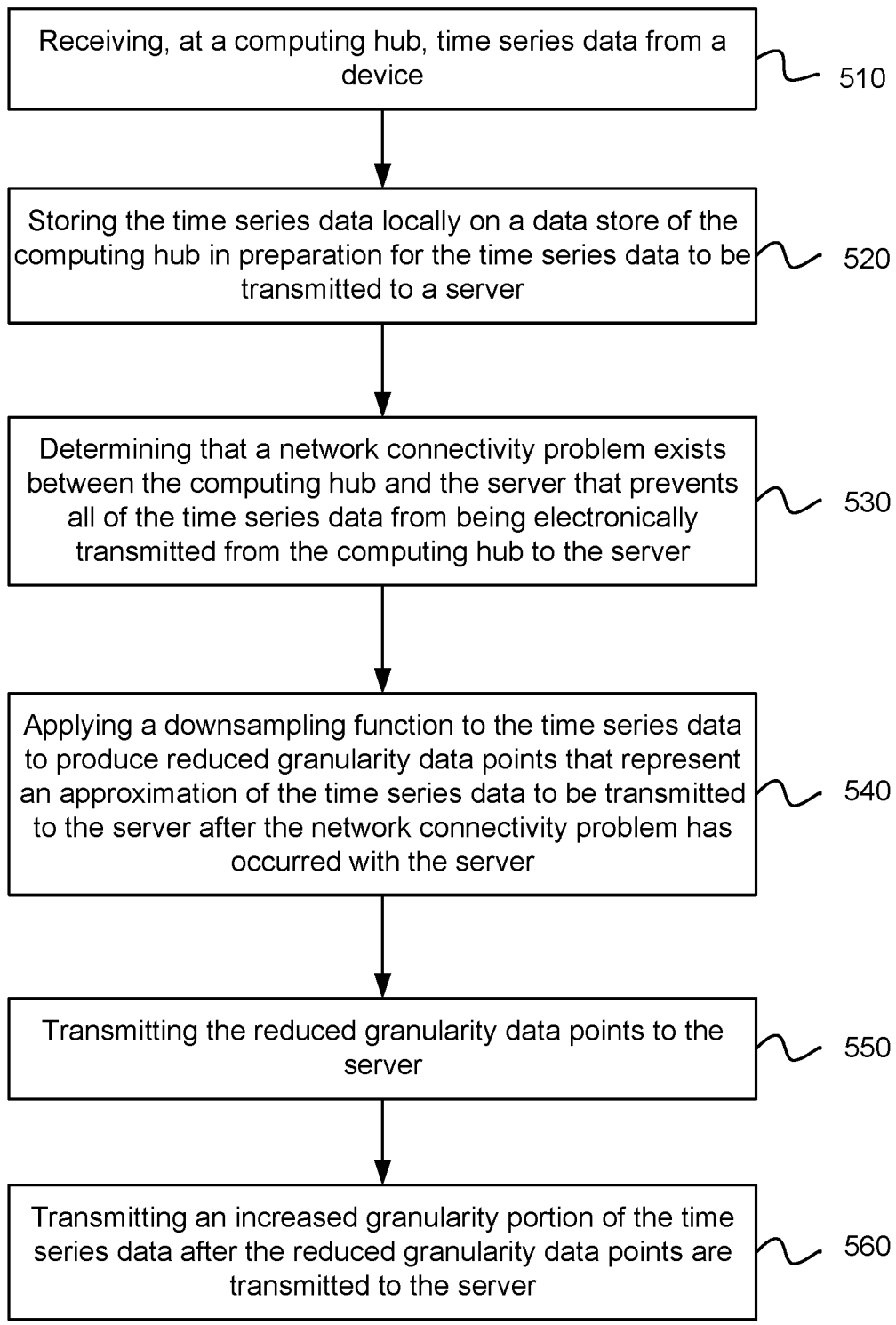
FIG. 5 is a flowchart of an example method for applying a downsampling function to time series data to produce reduced granularity data points and transmitting the reduced granularity data points to a server after a network connectivity problem between a computing hub and the server has been resolved.

FIG. 5 illustrates an example of a method for applying a downsampling function to time series data to produce reduced granularity data points and transmitting the reduced granularity data points to a server after a network connectivity problem between a computing hub and the server has been resolved. Time series data may be received at a computing hub from a plurality of devices, as in block 510. For example, the computing hub may receive the time series data from one or more IoT devices. The time series data may include a plurality of sensor data values ordered in time for individual IoT devices.

The time series data may be stored locally on a data store of the computing hub in preparation for the time series data to be transmitted to a server, as in block 520. For example, the data store of the computing hub may be a buffer, and the time series data may be temporarily stored in the buffer prior to transmission to the server.

A network connectivity problem for a computer network may be determined to exist between the computing hub and the server which prevents the time series data from being electronically transmitted from the computing hub to the server, as in block 530. In one example, the network connectivity problem may exist when a network data transfer rate between the computing hub and the server is below a defined threshold. For example, a network connectivity problem may be determined to exist when the network data transfer rate is less than 20% of a typical network data transfer rate (or another percentage less than any set percentage of network bandwidth capacity). In another example, the network connectivity problem may exist when an amount of time series data stored in the data store of the computing hub exceeds a defined threshold. For example, a network connectivity problem may be determined to exist when the time series data stored in the data store of the computing hub exceeds 80-90% of the data store capacity, which may indicate that the time series data is not being successfully transmitted from the computing hub. In yet another example, the network connectivity problem may exist when a connection between the computing hub and the server is unavailable.

A downsampling function may be applied to the time series data to produce reduced granularity data points that represent an approximation of the time series data to be transmitted to the server after the network connectivity problem has occurred with the server, as in block 540. For example, the reduced granularity data points may represent an aggregation of the time series data or a down sampling of the time series data.

The reduced granularity data points may be transmitted to the server after the network connectivity problem between the computing hub and the server has been resolved, as in block 550. The server may use the reduced granularity data points to compute various data metrics.

An increased granularity portion of the time series data may be transmitted after the reduced granularity data points are transmitted to the server, as in block 560. For example, the computing hub may transmit the portion of the time series data in increasing resolution or in the entire raw form after the reduced granularity data points are transmitted and after the network connectivity problem between the computing hub and the server has been resolved. The increased granularity of the time series data may allow the server to refine or update the computed data metrics. Further, a remainder of the time series data may be transmitted to the server after the network connectivity problem between the computing hub and the server has been resolved.

Figure 6:
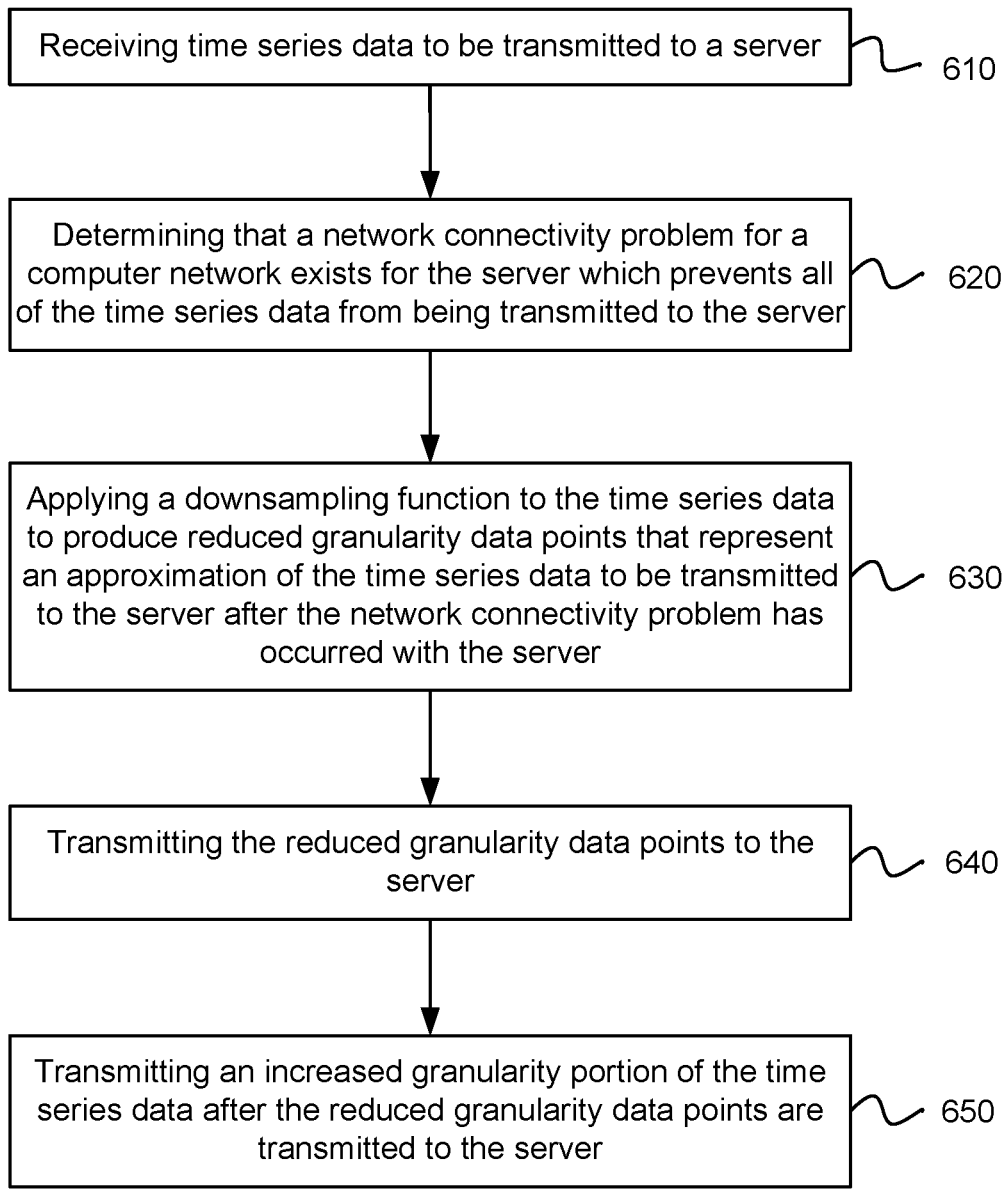
FIG. 6 is a flowchart of another example method for applying a downsampling function to time series data to produce reduced granularity data points and transmitting the reduced granularity data points to a server after a network connectivity problem between a computing hub and the server has been resolved.

FIG. 6 illustrates an example of a method for applying a downsampling function to time series data to produce reduced granularity data points. Time series data to be transmitted to a server may be received, as in block 610. The time series data may be received at a computing hub from one or more devices, such as IoT devices. Alternatively, a device may capture the time series data and prepare the time series data for direct transmission to the server without use of the computing hub.

A network connectivity problem may be determined to exist for a computer network with the server which prevents the time series data from being transmitted to the server, as in block 620. In one example, the network connectivity problem may exist when a network data transfer rate to the server is below a defined threshold, an amount of time series data stored in a data store of the computing hub exceeds a defined threshold, a connection between the computing hub and the server is unavailable, indicators show that a reduced amount of data or no data is being transferred to the server, etc.

A downsampling function may be applied to the time series data to produce reduced granularity data points that represent an approximation of the time series data to be transmitted to the server after the network connectivity problem has occurred with the server, as in block 630. The reduced granularity data points may represent an aggregation of the time series data or a down sampling of the time series data. In one example, the downsampling function selected to be applied to the time series data may be based on an instruction received via a user interface.

The reduced granularity data points may be transmitted to the server after the network connectivity problem between the computing hub and the server has been resolved, as in block 640. The server may use the reduced granularity data points to compute various data metrics, such as aggregation metrics which may be computed using the reduced granularity data points. In one example, the complete or full set of time series data may be transmitted to the server after the reduced granularity data points are transmitted and after the network connectivity problem with the server has been resolved. In another example, based on available bandwidth, an increased resolution or granularity portion of the time series data may be transmitted to the server after the reduced granularity data points are transmitted and after the network connectivity problem with the server has been resolved.

An increased granularity portion of the time series data may be transmitted after the reduced granularity data points are transmitted to the server, as in block 650. For example, the computing hub may transmit the portion of the time series data in increasing resolution or in the entire raw form after the reduced granularity data points are transmitted and after the network connectivity problem between the computing hub and the server has been resolved.

Figure 7:
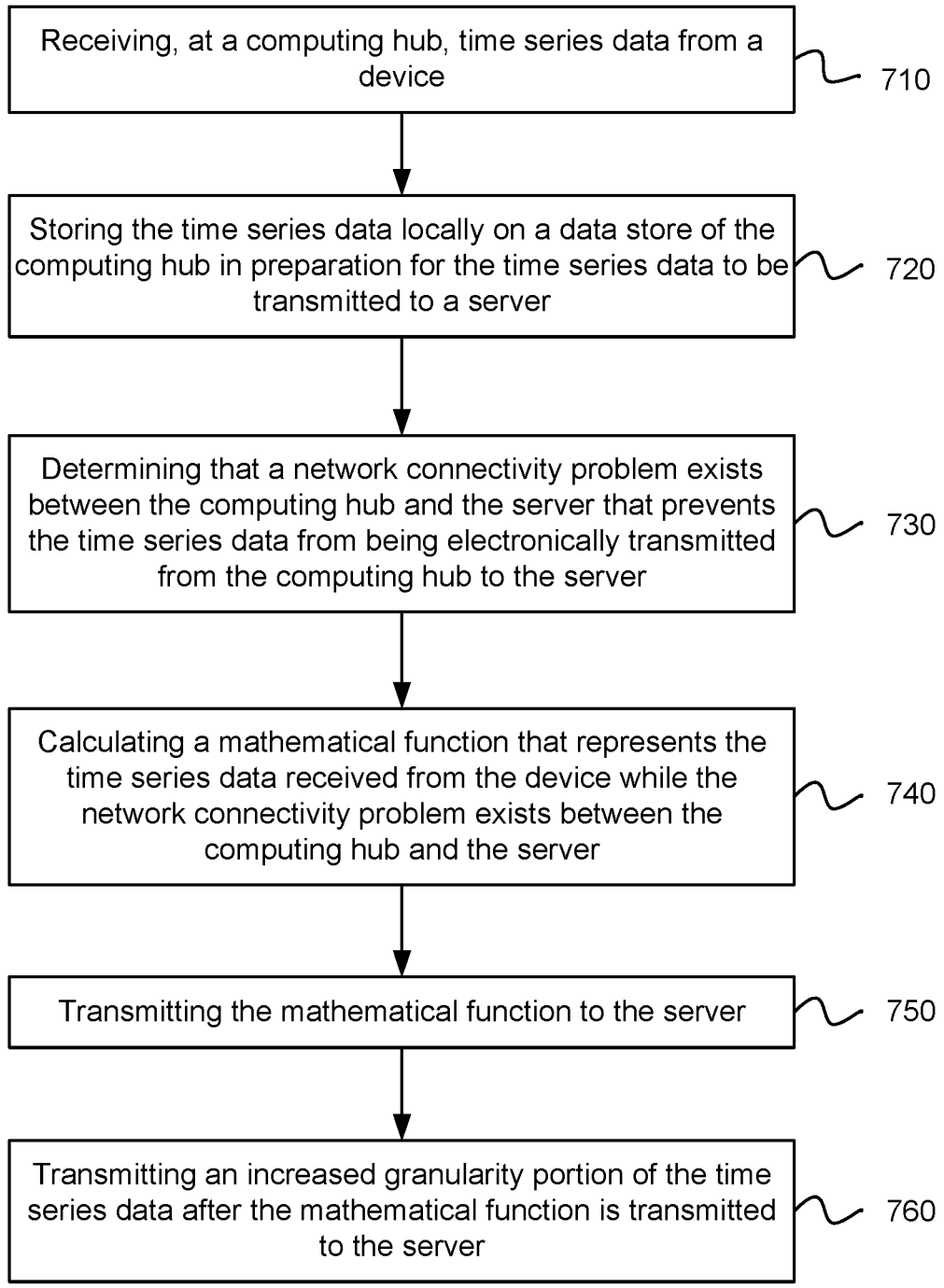
FIG. 7 is a flowchart of an example method for calculating a mathematical function that represents time series data received while a network connectivity problem exists between a computing hub and a server and transmitting the mathematical function to the server after the network connectivity problem has been resolved.

FIG. 7 illustrates an example of a method for calculating a mathematical function that represents time series data received while a network connectivity problem exists between a computing hub and a server. Time series data may be received at a computing hub from a plurality of devices, as in block 710. For example, the computing hub may receive the time series data from one or more IoT devices. The time series data may include a plurality of sensor data values ordered in time for individual IoT devices.

The time series data may be stored locally on a data store of the computing hub in preparation for the time series data to be transmitted to a server, as in block 720. For example, the data store of the computing hub may be a buffer, and the time series data may be temporarily stored in the buffer prior to transmission to the server.

A network connectivity problem for a computer network may be determined to exist between the computing hub and the server which prevents the time series data from being electronically transmitted from the computing hub to the server, as in block 730. The network connectivity problem may occur after a connection was previously established between the server and the computing hub. In one example, the network connectivity problem may exist when a network data transfer rate between the computing hub and the server is below a defined threshold. For example, a network connectivity problem may be determined to exist when the network data transfer rate is less than 20% of a typical network data transfer rate (or another percentage less than any set percentage of network bandwidth capacity). In another example, the network connectivity problem may exist when an amount of time series data stored in the data store of the computing hub exceeds a defined threshold. For example, a network connectivity problem may be determined to exist when the time series data stored in the data store of the computing hub exceeds 80-90% of the data store capacity, which may indicate that the time series data is not being successfully transmitted from the computing hub. In yet another example, the network connectivity problem may exist when a connection between the computing hub and the server is unavailable.

A mathematical function may be calculated that represents the time series data received from the plurality of devices while the network connectivity problem exists between the computing hub and the server, as in block 740. The mathematical function that represents the time series data may be fitting a curve to the data or an aggregation function. For example, the mathematical function that represents the time series data may be a linear function, polynomial function, quadratic function, exponential function, sinusoidal function, spline, etc.

The mathematical function may be transmitted to the server after the network connectivity problem between the computing hub and the server has been resolved, as in block 750. The server may use the mathematical function to compute various metrics. In one example, the computing hub may transmit the time series data in increasing resolution or in the entire raw form after the mathematical function is transmitted and after the network connectivity problem between the computing hub and the server has been resolved.

An increased granularity portion of the time series data may be transmitted to the server after the mathematical function is transmitted to the server, as in block 760. For example, the computing hub may transmit the portion of the time series data in increasing resolution or in the entire raw form after the mathematical function is transmitted and after the network connectivity problem between the computing hub and the server has been resolved. The increased granularity of the time series data may allow the server to refine or update the computed data metrics. Further, a remainder of the time series data may be transmitted to the server after the network connectivity problem between the computing hub and the server has been resolved.

Figure 8:
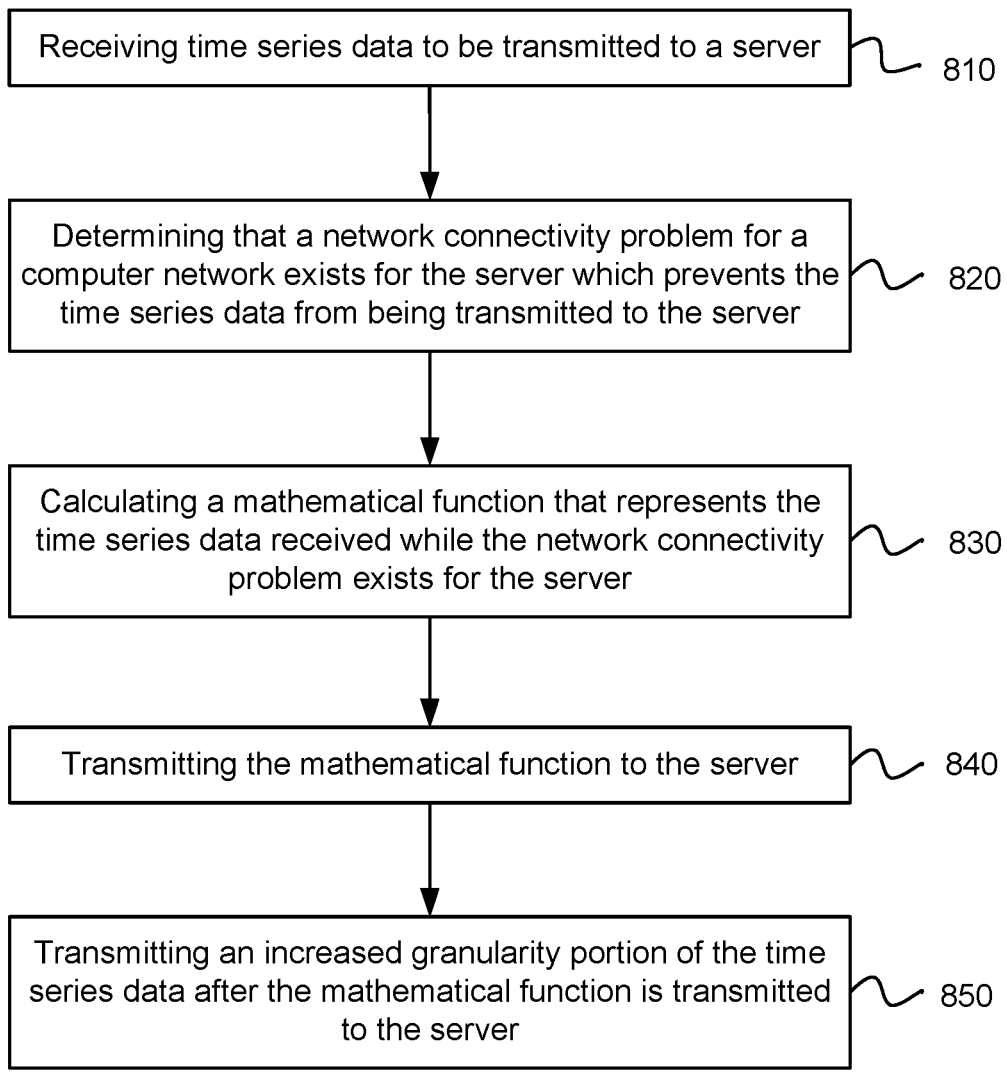
FIG. 8 is a flowchart of another example method for calculating a mathematical function that represents time series data received while a network connectivity problem exists between a computing hub and a server and transmitting the mathematical function to the server after the network connectivity problem has been resolved.

FIG. 8 illustrates an example of a method for calculating a mathematical function that represents time series data received, while a network connectivity problem exists between a computing hub and a server. Time series data to be transmitted to a server may be received, as in block 810. The time series data may be received at a computing hub from one or more devices, such as IoT devices. Alternatively, a device may capture the time series data and prepare the time series data for direct transmission to the server without use of the computing hub.

A network connectivity problem may be determined to exist for a computer network with the server which prevents the time series data from being transmitted to the server, as in block 820. In one example, the network connectivity problem may exist when a network data transfer rate to the server is below a defined threshold, an amount of time series data stored in a data store of the computing hub exceeds a defined threshold, a connection between the computing hub and the server is unavailable, indicators show that a reduced amount of data or no data is being transferred to the server, etc.

A mathematical function may be calculated or derived that represents the time series data received while the network connectivity problem exists for the server, as in block 830. As an example, the mathematical function that represents the time series data may be fitting a curve to the data or an aggregation function.

The mathematical function may be transmitted to the server after the network connectivity problem has been resolved, as in block 840. The server may use the mathematical function to compute various data metrics, such as aggregation metrics. For example, the server may compute representative or estimated time series data points using the mathematical function, and then compute the data metrics using the representative or estimated time series data points.

An increased granularity portion of the time series data may be transmitted to the server after the mathematical function is transmitted to the server, as in block 850. For example, the computing hub may transmit the portion of the time series data in increasing resolution or in the entire raw form after the mathematical function is transmitted and after the network connectivity problem between the computing hub and the server has been resolved.

Figure 9:
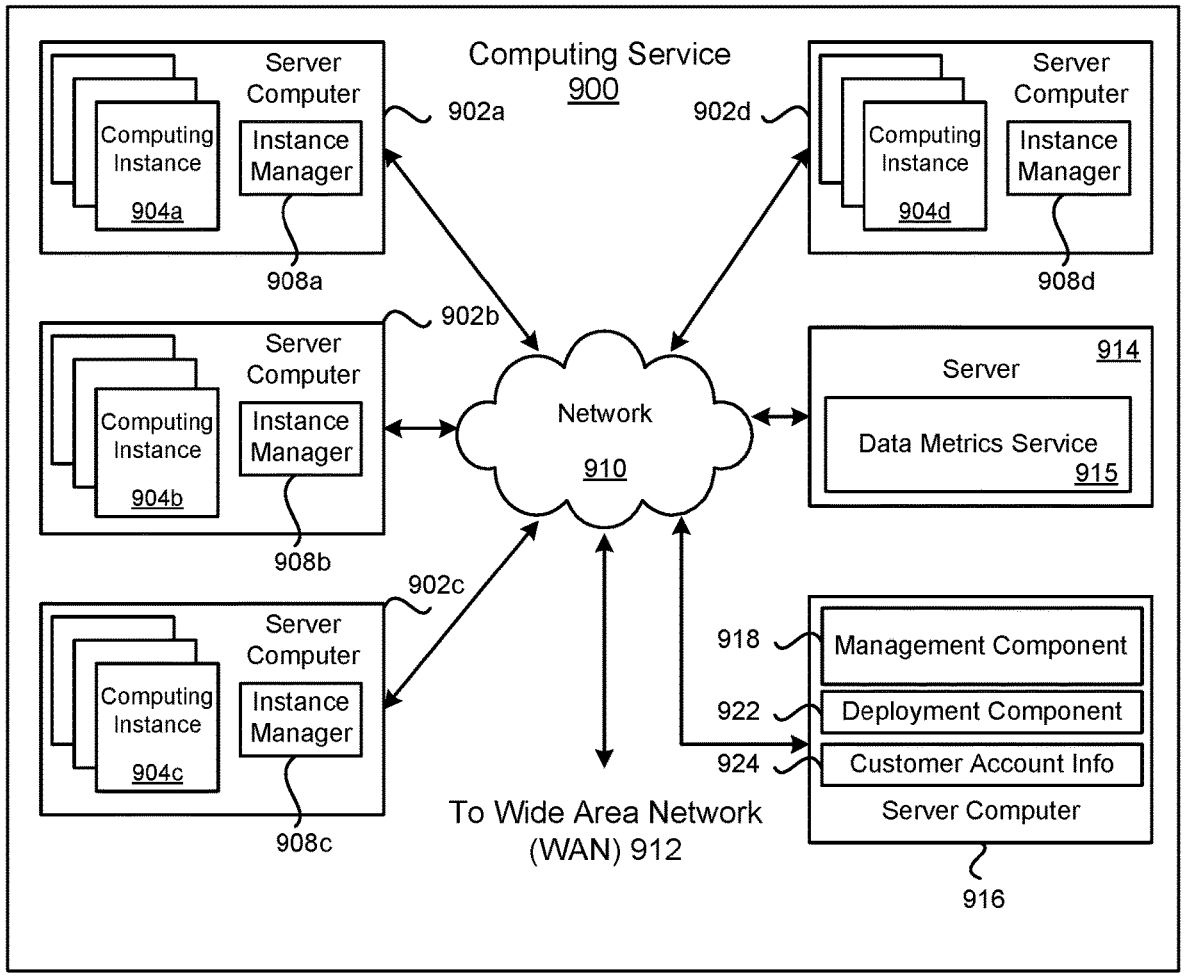
FIG. 9 is a block diagram of a service provider environment according to an example of the present technology.

FIG. 9 is a block diagram illustrating an example computing service 900 that may be used to execute and manage a number of computing instances 904a-d upon which the present technology may execute. In particular, the computing service 900 depicted illustrates one environment in which the technology described herein may be used. The computing service 900 may be one type of environment that includes various virtualized service resources that may be used, for instance, to host computing instances 904a-d.

The computing service 900 may be capable of delivery of computing, storage and networking capacity as a software service to a community of end recipients. In one example, the computing service 900 may be established for an organization by or on behalf of the organization. That is, the computing service 900 may offer a "private cloud environment." In another example, the computing service 900 may support a multi-tenant environment, wherein a plurality of customers may operate independently (i.e., a public cloud environment). Generally speaking, the computing service 900 may provide the following models: Infrastructure as a Service ("IaaS") and/or Software as a Service ("SaaS"). Other models may be provided. For the IaaS model, the computing service 900 may offer computers as physical or virtual machines and other resources. The virtual machines may be run as guests by a hypervisor, as described further below. The PaaS model delivers a computing system that may include an operating system, programming language execution environment, database, and web server.

Application developers may develop and run their software solutions on the computing service system without incurring the cost of buying and managing the underlying hardware and software. The SaaS model allows installation and operation of application software in the computing service 900. End customers may access the computing service 900 using networked client devices, such as desktop computers, laptops, tablets, smartphones, etc. running web browsers or other lightweight client applications, for example. Those familiar with the art will recognize that the computing service 900 may be described as a "cloud" environment.

The particularly illustrated computing service 900 may include a plurality of server computers 902a-d. The server computers 902a-d may also be known as physical hosts. While four server computers are shown, any number may be used, and large data centers may include thousands of server computers. The computing service 900 may provide computing resources for executing computing instances 904a-d. Computing instances 904a-d may, for example, be virtual machines. A virtual machine may be an instance of a software implementation of a machine (i.e. a computer) that executes applications like a physical machine. In the example of a virtual machine, each of the server computers 902a-d may be configured to execute an instance manager 908a-d capable of executing the instances. The instance manager 908a-d may be a hypervisor, virtual machine manager (VMM), or another type of program configured to enable the execution of multiple computing instances 904a-d on a single server. Additionally, each of the computing instances 904a-d may be configured to execute one or more applications.

A server 914 may be reserved to execute software components for implementing the present technology or managing the operation of the computing service 900 and the computing instances 904a-d. For example, the server 914 may include a data metrics service 915. The data metrics service 915 may receive reduced granularity data points or a mathematical function from a computing hub. The data metrics service 915 may compute metrics using the reduced granularity data points or the mathematical function received from the computing hub.

A server computer 916 may execute a management component 918. A customer may access the management component 918 to configure various aspects of the operation of the computing instances 904a-d purchased by a customer. For example, the customer may setup computing instances 904a-d and make changes to the configuration of the computing instances 904a-d.

A deployment component 922 may be used to assist customers in the deployment of computing instances 904a-d. The deployment component 922 may have access to account information associated with the computing instances 904a-d, such as the name of an owner of the account, credit card information, country of the owner, etc. The deployment component 922 may receive a configuration from a customer that includes data describing how computing instances 904a-d may be configured. For example, the configuration may include an operating system, provide one or more applications to be installed in computing instances 904a-d, provide scripts and/or other types of code to be executed for configuring computing instances 904a-d, provide cache logic specifying how an application cache is to be prepared, and other types of information. The deployment component 922 may utilize the customer-provided configuration and cache logic to configure, prime, and launch computing instances 904a-d. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the computing service 900 and the server computers 902a-d, 916. The network 910 may be a local area network (LAN) and may be connected to a Wide Area Network (WAN) 912 or the Internet, so that end customers may access the computing service 900. In addition, the network 910 may include a virtual network overlaid on the physical network to provide communications between the servers 902a-d. The network topology illustrated in FIG. 9 has been simplified, as many more networks and networking devices may be utilized to interconnect the various computing systems disclosed herein.

Figure 10:
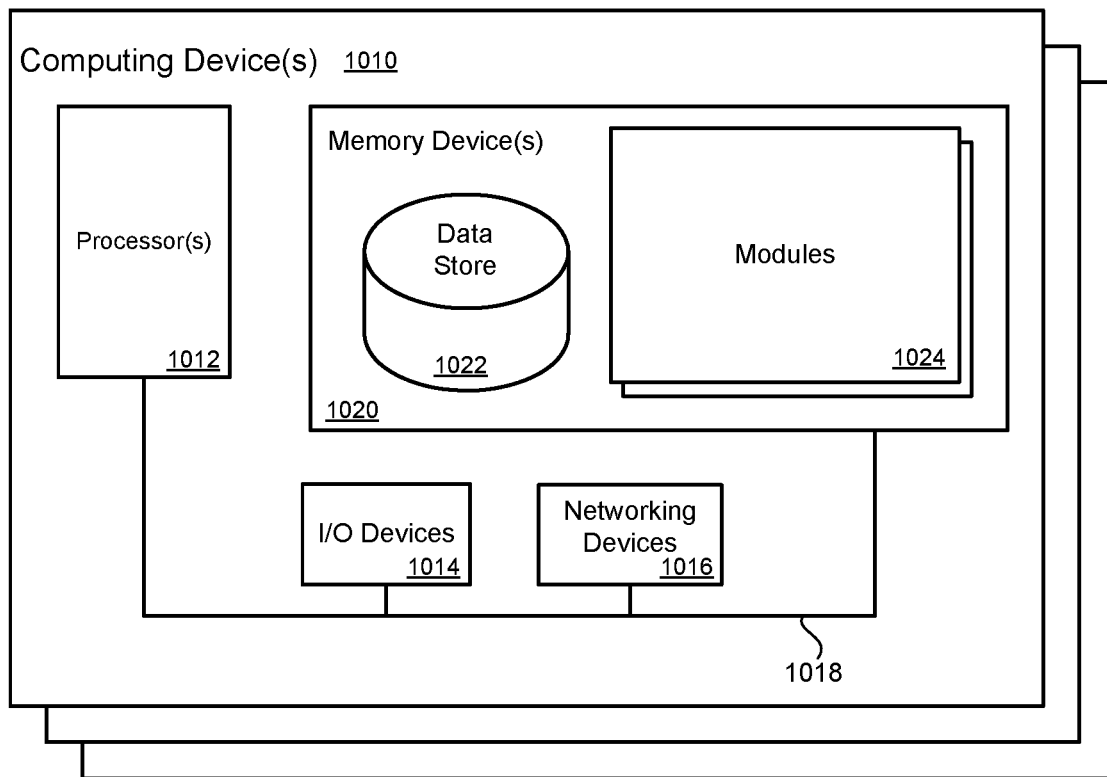
FIG. 10 is a block diagram that provides an example illustration of a computing device that may be employed in the present technology.

FIG. 10 illustrates a computing device 1010 on which modules of this technology may execute. The computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 that are executable by the processor(s) 1012 and data for the modules 1024. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon, the instructions when executed by one or more processors, cause the one or more processors to perform a process including:
    receiving, at a computing hub, time series data from a device;
    storing the time series data locally on a data store of the computing hub in preparation for the time series data to be transmitted to a server;
    determining that a network connectivity problem exists between the computing hub and the server that prevents all of the time series data from being electronically transmitted from the computing hub to the server;
    applying a downsampling function to the time series data to produce reduced granularity data points that represent an approximation of the time series data to be transmitted to the server after the network connectivity problem has occurred with the server;
    transmitting the reduced granularity data points to the server; and
    transmitting an increased granularity portion of the time series data after the reduced granularity data points are transmitted to the server.

2. The non-transitory machine readable storage medium of claim 1, wherein the increased granularity portion includes a remainder of the time series data.

3. The non-transitory machine readable storage medium of claim 1, wherein the time series data is first time series data, and further comprising:
    receiving subsequent time series data from the device after the network connectivity problem has been resolved, wherein the subsequent time series data is received later in time as compared to the first time series data, wherein the first time series data continues to be stored locally on the data store; and
    prioritizing the subsequent time series data for transmission to the server in relation to the time series data that was previously received from the device.

4. The non-transitory machine readable storage medium of claim 1, further comprising: determining that the network connectivity problem exists between the computing hub and the server when the network connectivity condition occurs that is at least one of: a network data transfer rate to the server is below a defined threshold, when an amount of time series data stored in the data store of the computing hub exceeds a defined threshold, or when a connection between the computing hub and the server is unavailable.

5. The non-transitory machine readable storage medium of claim 1, wherein the reduced granularity data points represent an aggregation of the time series data.

6. A method, comprising:
    receiving time series data to be transmitted to a server;
    determining that a network connectivity problem for a computer network exists for the server which prevents all of the time series data from being transmitted to the server;
    applying a downsampling function to the time series data to produce reduced granularity data points that represent an approximation of the time series data to be transmitted to the server after the network connectivity problem has occurred with the server;
    transmitting the reduced granularity data points to the server; and
    transmitting an increased granularity portion of the time series data after the reduced granularity data points are transmitted to the server.

7. The method of claim 6, further comprising: determining that the network connectivity problem exists between the computing hub and the server when a connectivity condition occurs that is at least one of: a network data transfer rate to the server is below a defined threshold, when an amount of time series data stored in the data store of the computing hub exceeds a defined threshold, or when a connection between the computing hub and the server is unavailable.

8. The method of claim 6, further comprising selecting the downsampling function to be applied to the time series data based on the network connectivity problem.

9. The method of claim 6, further comprising selecting the downsampling function to be applied to the time series data based on an instruction received via a user interface.

10. The method of claim 6, wherein the time series data is first time series data, and further comprising:
    receiving subsequent time series data after the network connectivity problem has been resolved, wherein the subsequent time series data is received later in time as compared to the first time series data; and
    prioritizing the subsequent time series data for transmission to the server in relation to the first time series data.

11. The method of claim 6, further comprising: transmitting the time series data after the reduced granularity data points are transmitted and after the network connectivity problem between the computing hub and the server has been resolved.

12. The method of claim 6, wherein applying the downsampling function is performed by a computing hub or a device.

13. The method of claim 6, wherein the time series data is first time series data, and further comprising:
    assigning a first quality tag to the reduced granularity data points that represent the first time series data;
    transmitting subsequent time series data to the server after the network connectivity problem has been resolved, wherein the subsequent time series data is received later in time as compared to the first time series data;

assigning a second quality tag to the subsequent time series data; and providing a graphical user interface (GUI) that allows the first time series data and the subsequent time series data to be filtered based on a quality tag.

14. The method of claim 6, further comprising: transmitting the reduced granularity data points to the server prior to transmitting the time series data to the server.

15. The method of claim 6, further comprising: transmitting the reduced granularity data points to the server to enable the server to calculate data metrics using the reduced granularity data points, wherein the data metrics are updated at the server after the time series data is transmitted to the server.

16. A server, comprising:
at least one processor; and
at least one memory device including a data store to store a plurality of data and instructions that, when executed, cause the server to:
establish a connection to a computing hub;
receive reduced granularity data points from the computing hub, wherein the reduced granularity data points result from a downsampling function being applied to time series data that is to be transmitted by the computing hub, the downsampling function applied by the computing hub in response to determining that a network connectivity problem exists between the server and the computing hub, wherein the reduced granularity data points represent an approximation of the time series data; and
compute, at the server, data metrics using the reduced granularity data points received from the computing hub.

17. The server of claim 16, wherein the plurality of data and instructions, when executed, cause the server to:
receive the time series data from the computing hub after the network connectivity problem between the computing hub and the server has been resolved; and
update the data metrics based on the time series data.

18. The server of claim 16, wherein the time series data is first time series data, and wherein the plurality of data and instructions, when executed, cause the server to: receive subsequent time series data from the computing hub after the network connectivity problem between the computing hub and the server has been resolved, wherein the subsequent time series data has an increased priority level for transmission from the computing hub in relation to the first time series data.

19. The server of claim 16, wherein the reduced granularity data points represent an aggregation of the time series data.

20. The server of claim 16, wherein the plurality of data and instructions, when executed, cause the server to: determine that the network connectivity problem exists between the computing hub and the server when the network connectivity condition occurs that is at least one of: a network data transfer rate to the server is below a defined threshold, when an amount of time series data stored in the data store of the computing hub exceeds a defined threshold, or when a connection between the computing hub and the server is unavailable.

* * * * *